United States Patent
Motoda

(10) Patent No.: US 11,199,620 B2
(45) Date of Patent: Dec. 14, 2021

(54) RADAR DEVICE AND CONTROL METHOD THEREFOR

(71) Applicant: RENESAS ELECTRONICS CORPORATION, Tokyo (JP)

(72) Inventor: Yuji Motoda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 316 days.

(21) Appl. No.: 16/385,700

(22) Filed: Apr. 16, 2019

(65) Prior Publication Data

US 2019/0346547 A1    Nov. 14, 2019

(30) Foreign Application Priority Data

May 10, 2018 (JP) .............................. JP2018-091452

(51) Int. Cl.
  *G01S 13/48*    (2006.01)
  *G01S 7/282*    (2006.01)
  (Continued)

(52) U.S. Cl.
  CPC .............. *G01S 13/48* (2013.01); *G01S 7/282* (2013.01); *G01S 7/34* (2013.01); *G01S 13/931* (2013.01)

(58) Field of Classification Search
  CPC ........ G01S 13/343; G01S 13/42; G01S 13/48; G01S 13/931; G01S 7/282; G01S 7/34; G01S 7/40
  See application file for complete search history.

(56) References Cited

U.S. PATENT DOCUMENTS 6,246,359 B1 * 6/2001 Asano ..................... G01S 13/93
                                                     342/158
7,145,500 B2    12/2006 Ikeda et al.
(Continued)

FOREIGN PATENT DOCUMENTS

JP    2006-064644 A    3/2006
WO   2009/032467 A1   3/2009

OTHER PUBLICATIONS

Extended European Search Report issued in corresponding European Patent Application No. 19172784.1-1206, dated Nov. 6, 2019.

*Primary Examiner* — Timothy X Pham
(74) *Attorney, Agent, or Firm* — McDermott Will & Emery LLP

(57) ABSTRACT

A radar device is provided which is capable of highly accurate distance calculation by a simple method. The radar device includes: a transmission circuit which transmits radio waves; an adjustment circuit which adjusts transmission angles of the radio waves transmitted from the transmission circuit; a reception circuit which receives plural signals which are the radio waves transmitted, based on adjustment made by the adjustment circuit, from the transmission circuit and respectively reflected from an object; and a signal processing circuit which, by processing the received signals, calculates a distance to the object. The signal processing circuit includes a buffer which stores signal strength data on the signals received by the reception circuit, the received signals respectively corresponding to the transmission angles, and a correction circuit which performs correction processing on equidistance-based portions of the signal strength data on the received signals stored in the buffer.

4 Claims, 10 Drawing Sheets

(51) Int. Cl.
   *G01S 7/34* (2006.01)
   *G01S 13/931* (2020.01)

(56) References Cited

U.S. PATENT DOCUMENTS

| | | |
|---|---|---|
| 2008/0001808 A1 | 1/2008 | Passarelli et al. |
| 2009/0009383 A1* | 1/2009 | Nakanishi ............... G01S 13/42 342/118 |
| 2012/0249363 A1* | 10/2012 | Kolinko ............... H01Q 19/175 342/179 |
| 2019/0219678 A1* | 7/2019 | Miyazawa .............. G01S 11/06 |

* cited by examiner

RADAR DEVICE AND CONTROL METHOD THEREFOR

CROSS-REFERENCE TO RELATED APPLICATIONS

The disclosure of Japanese Patent Application No. 2018-091452 filed on May 10, 2018 including the specification, drawings and abstract is incorporated herein by reference in its entirety.

BACKGROUND

This disclosure relates to a radar device which detects a distance from an object based on radio waves reflected from the object.

Generally, radar devices are used for various purposes. For example, recent automobiles are mounted with a radar device for purposes of collision prevention and automatic cruising.

In such radar devices, a distance to and from an object is calculated by multiplying the time taken from when pulse waves are transmitted toward an object until when the pulse waves reflected from the object is received by the light speed.

To be specific, to calculate the distance to an object, the time taken from when pulse waves are transmitted toward an object until when the pulse waves reflected from the object are received is measured.

The signal strength of reflected waves possibly decreases with time.

Hence, in Japanese Unexamined Patent Application Publication No. 2006-64644, increasing with time the degree of amplification made by a reception circuit is proposed as a method of smoothing the received-wave signal strength.

There are, however, cases where the signal strength of reflected waves from an object is greatly affected not only by the distance to the object but also by the size and reflectance of the object.

Therefore, uniformly increasing with time the degree of amplification made by the reception circuit as proposed in the above patent literature may possibly also increase noise attributable to the size and reflectance of the object. This possibly makes it difficult to accurately calculate the distance to the object.

The method proposed in the above patent literature has another problem that the method is applicable only to pulse radar devices.

SUMMARY

This disclosure addresses to the above problems and provides a radar device capable of highly accurate distance calculation in a simple way and a method for controlling the radar device.

Other objects and novel features of the present invention will become apparent from the description of this specification and attached drawings.

The radar device according to an aspect of the present disclosure includes: a transmission circuit which transmits radio waves; an adjustment circuit which adjusts transmission angles of the radio waves transmitted from the transmission circuit; a reception circuit which receives plural signals which are the radio waves transmitted, based on adjustment made by the adjustment circuit, from the transmission circuit and respectively reflected from an object; and a signal processing circuit which, by processing the received signals, calculates a distance to the object. The signal processing circuit includes a buffer which stores signal strength data on the signals received by the reception circuit, the received signals respectively corresponding to the transmission angles, and a correction circuit which performs correction processing on equidistance-based portions of the signal strength data on the received signals stored in the buffer.

According to an embodiment of the present invention, the radar device and the control method therefor of this disclosure enables highly accurate distance calculation in a simple way.

DETAILED DESCRIPTION

Figure 1:
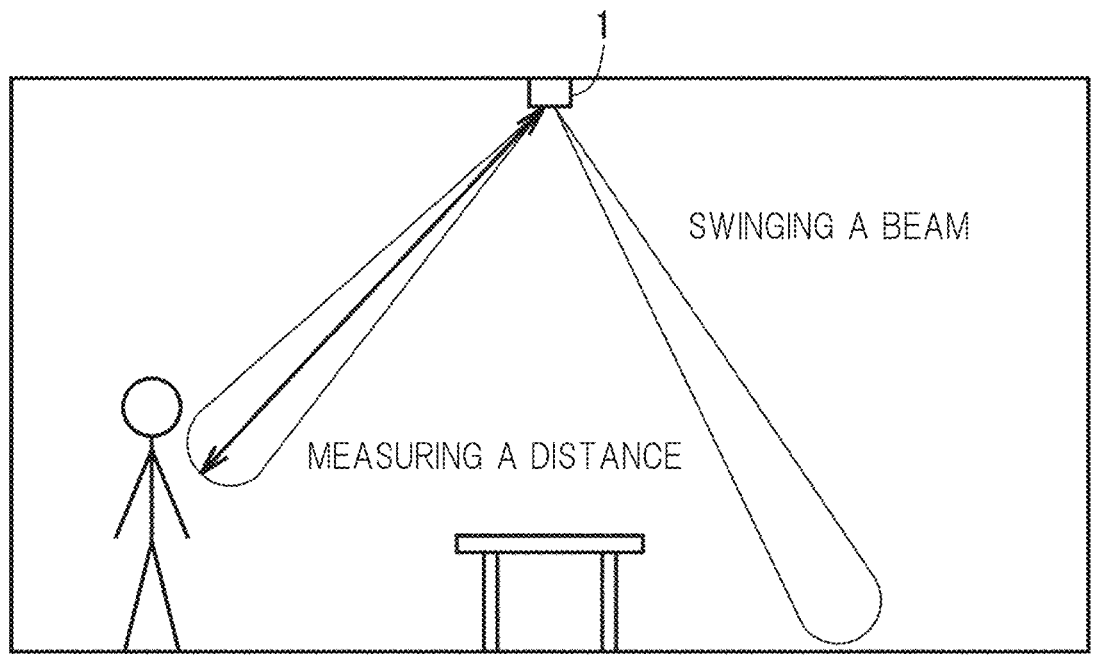
FIG. 1 is a diagram for describing an outline of spatial measurement by a radar device 1 according to a first embodiment.

Embodiments of the present invention will be described in detail with reference to drawings. In the drawings referred to in the following, identical parts and mutually equivalent parts will be denoted by identical numerals and descriptive duplication will be avoided.

First Embodiment

FIG. 1 is a diagram for describing an outline of spatial measurement by a radar device 1 according to a first embodiment.

Figure 2:
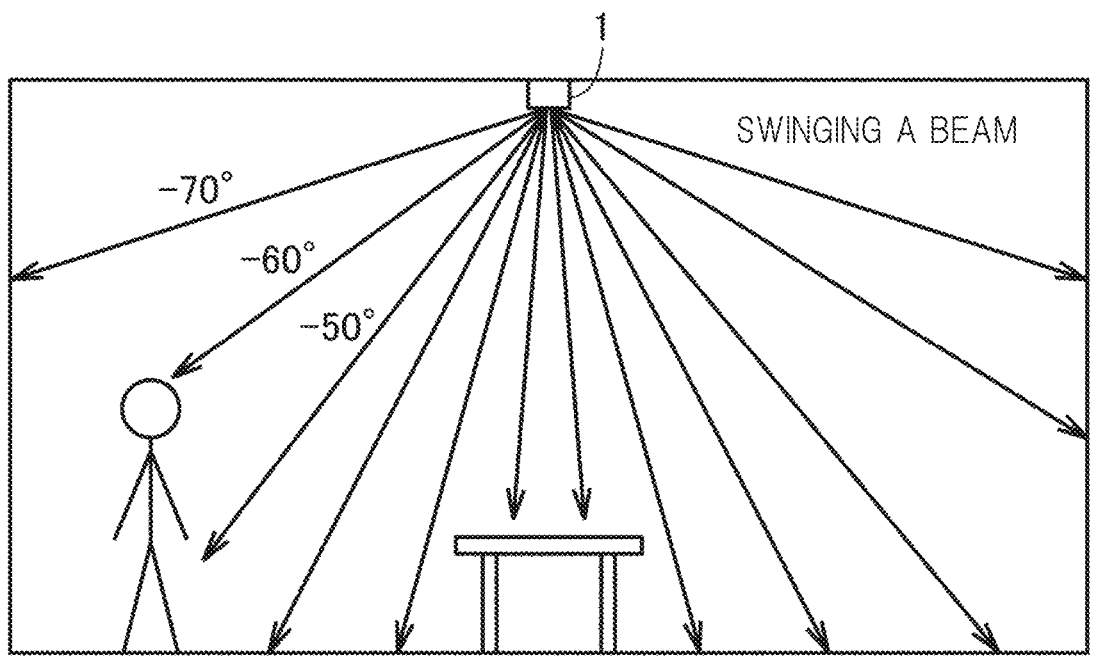
FIG. 2 is a diagram for describing a method of spatial measurement used by the radar device 1 of the first embodiment.

FIG. 2 is a diagram for describing a method of spatial measurement used by the radar device 1 according to the first embodiment.

The radar device 1 of the first embodiment is, for example, attached to a ceiling as shown in FIGS. 1 and 2.

The following description is based on an example case in which the radar device 1 is attached to a ceiling, but the location of installation of the radar device 1 is not limited to a ceiling and the radar device 1 can be installed in various specified locations.

The radar device 1 controls scanning in a measurement-target direction. This can be achieved by controlling the directivity of waves being transmitted or received. In the present example, the radar device 1 scans in one direction.

The radar device 1 of the first embodiment transmits waves at each of angles spaced apart by a certain angle and, by measuring waves reflected from an object, measures the distance in the direction of the reflected waves between the radar device 1 and the object.

The directivity of waves being transmitted or received can be controlled mechanically or electronically using a phased array. By controlling the directivity of waves being transmitted or received (hereinafter also referred to as "beam swinging"), the radar device 1 can measure the distance to an object in the beam direction.

Various ranging methods can be applied to the radar device 1, for example, the FCM (Fast Chirp Modulation) method or a method in which pulse waves or FMCWs (Frequency Modulated Continuous Waves) are used.

The radar device 1 can measure distances in different directions by transmitting waves in different directions in measurement space and measuring reflected waves.

Therefore, the radar device 1 installed in a specific location can determine the location and shape of an object present in measurement-target space.

Figure 3:
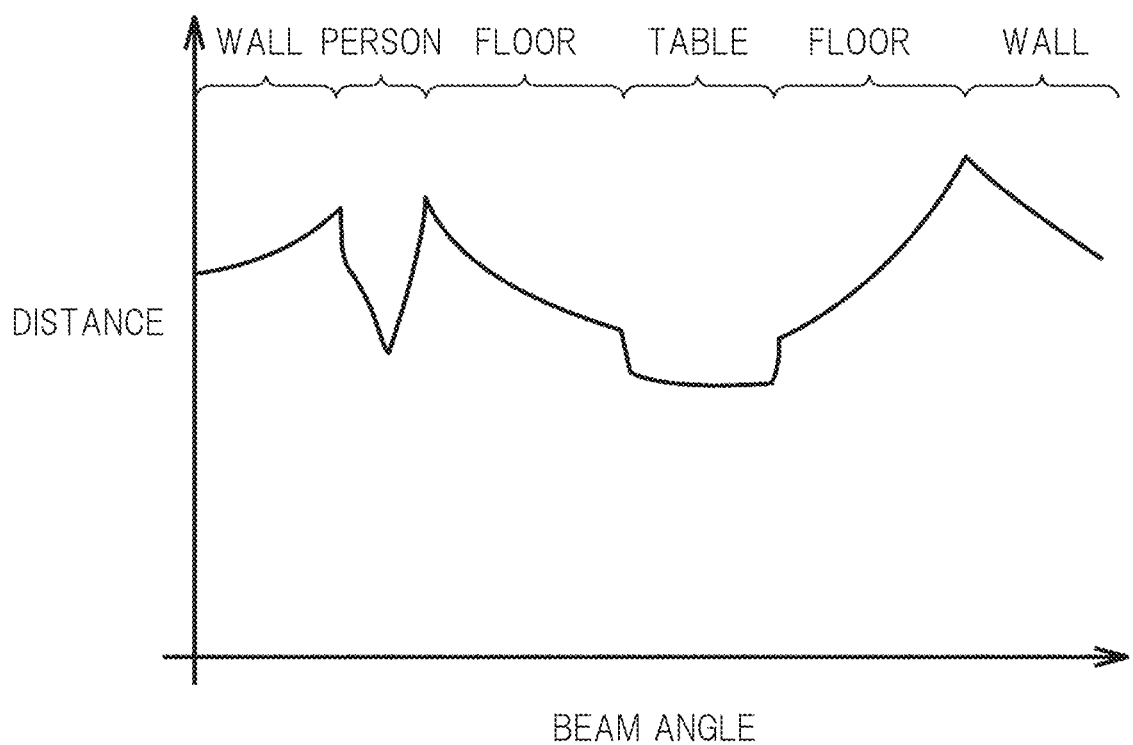
FIG. 3 is a diagram for describing an example of ranging by spatial measurement made by the radar device 1 of the first embodiment.

FIG. 3 is a diagram for describing an example of ranging by spatial measurement made by the radar device 1 of the first embodiment.

FIG. 3 shows distances with respect to beam angles in a case of spatial measurement. Distances are represented based on a polar coordinate system, so that flat surfaces, for example, surfaces of floors and walls are represented as gentle curves. Where, for example, a person or a table is present, the distance to the person or the table is represented as being shorter with the distance curve deviating from the gentle portion.

Figure 4:
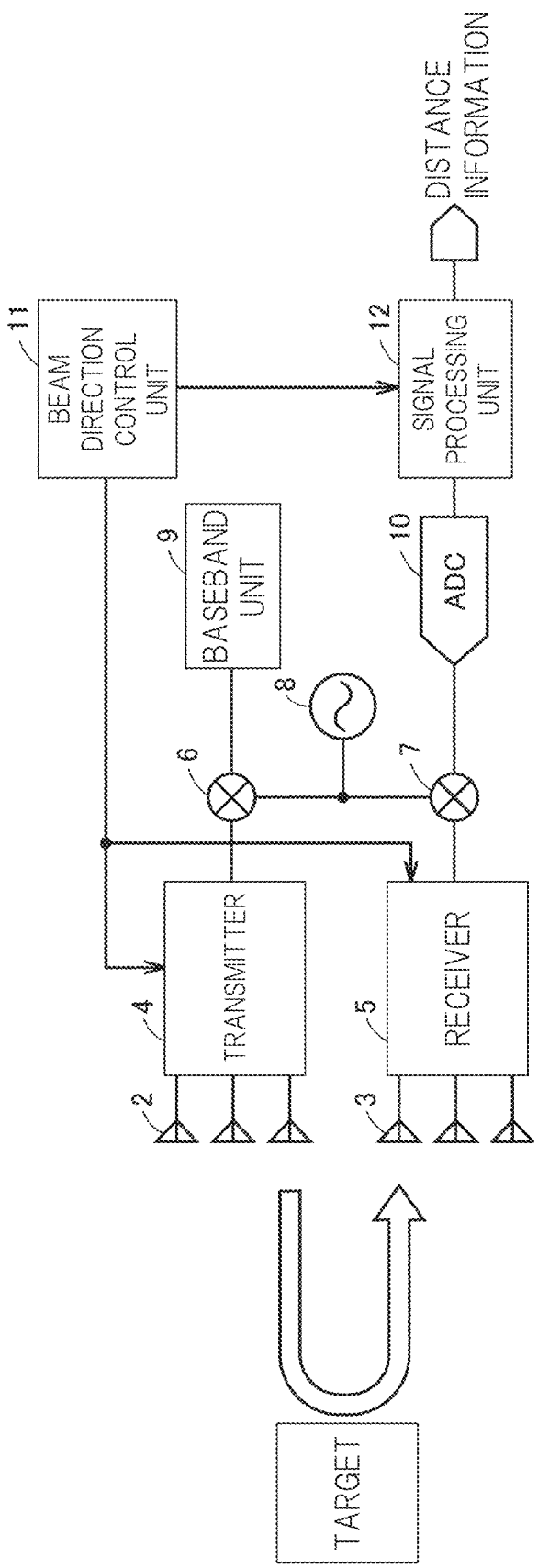
FIG. 4 is a block diagram of the configuration of the radar device 1 of the first embodiment.

FIG. 4 is a block diagram of the configuration of the radar device 1 of the first embodiment.

As shown in FIG. 4, the radar device 1 includes transmitting antennas 2, receiving antennas 3, a transmitter 4, a receiver 5, mixers 6 and 7, a VCO (Voltage-Controlled Oscillator) 8, a baseband unit 9, an ADC 10, a beam direction control unit 11 and a signal processing unit 12.

Though, in the present example, six antennas are included in the configuration, the number of antennas is optional.

The radar device 1 generates a baseband signal such as CWs, FMCWs and pulse waves at the baseband unit 9.

At the mixer 6, a transmission signal is generated by combining a carrier signal from the VCO 8 and the baseband signal.

When the transmission signal is received, the transmitter 4 distributes the transmission signal to the transmitting antennas 2 so as to have beams outputted in the direction specified by the beam direction control unit 11. The distributed transmission signals are outputted from the respective transmitting antennas 2. The transmitted signals hit an object, reflected from the object, and then received by the receiving antennas 3.

The receiver 5 amplifies the signal received from each of the receiving antennas 3 and has the signal received by each of the receiving antennas 3 processed for beam forming by the beam direction control unit 11. In cases where beam forming processing is performed by the signal processing unit 12, the receiver 5 may be configured not to perform beam forming processing.

The signals received by the receiver 5 are combined with a carrier signal from the VCO 8 at the mixer 7 and are thereby made into baseband received signals.

The baseband received signals are converted into digital signals by the ADC 10.

The signal processing unit 12, by subjecting the digital signals to predetermined processing, extracts distance information and outputs the extracted distance information. The distance information is associated with the beam direction angle information from the beam direction control unit 11.

Figure 5:
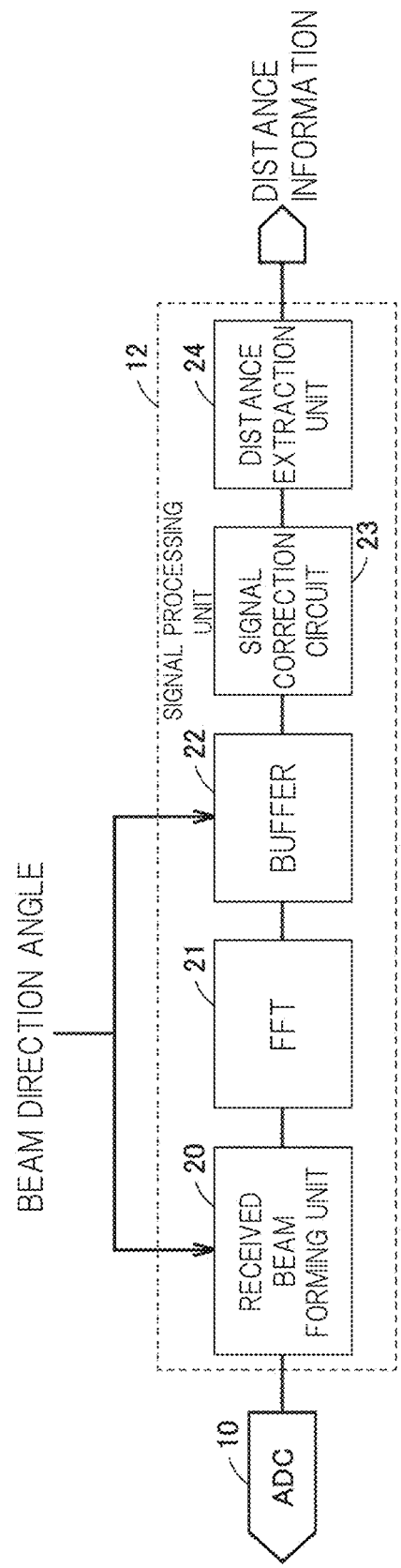
FIG. 5 is a diagram for describing the configuration of a signal processing unit 12 of the first embodiment.

FIG. 5 is a diagram for describing the configuration of the signal processing unit 12 of the first embodiment.

As shown in FIG. 5, the signal processing unit 12 includes a received beam forming unit 20, an FFT 21, a buffer 22, a signal correction circuit 23 and a distance extraction unit 24.

The received beam forming unit 20 provides the received signals outputted from the ADC 10 with directivity corresponding to beam direction angles.

The FFT 21 performs FFT processing on the output from the received beam forming unit 20. The buffer 22 stores the output from the FFT 21.

When storing the output from the FFT 21, the buffer 22 associates the output from the FFT 21 with the beam direction angles outputted from the beam direction control unit 11. To be specific, the buffer 22 stores signal strength data on the signals received after being reflected from an object, the received signals corresponding to the signals outputted as beams from the beam direction control unit 11.

The signal correction circuit 23 performs data correction processing based on the values outputted from the FFT 21 and stored in the buffer 22. To be specific, the signal correction circuit 23 performs correction processing on equidistance-based portions of the signal strength data on the plural received signals stored in the buffer 22.

The distance extraction unit 24 extracts distance information from the signal strength data corrected by the signal correction circuit 23.

Figure 6:
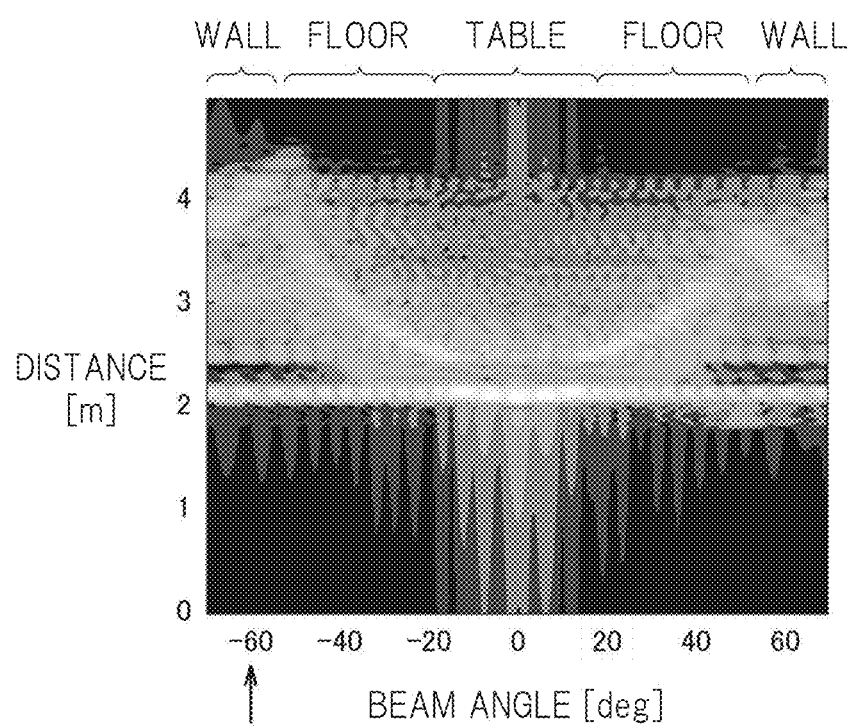
FIG. 6 is a diagram for describing an output from an FFT 21 of the first embodiment.

FIG. 6 is a diagram for describing a spatial measurement simulation made using the radar device 1 of the first embodiment.

The simulation was made with only a table present in the space described with reference to FIG. 1 and nobody was present in the space.

FIG. 6 shows a state of signal strength data stored in the buffer 22 with the signal strength data corresponding to beam angles.

The signal strength is represented by grayscale shading with shading closer to white representing higher received-signal strength and shading closer to black representing lower received-signal strength. Data showing high signal strength is considered to be representing intensive waves reflected from an object. That is, an object is assumed to be present at a location corresponding to high signal strength.

Figure 7:
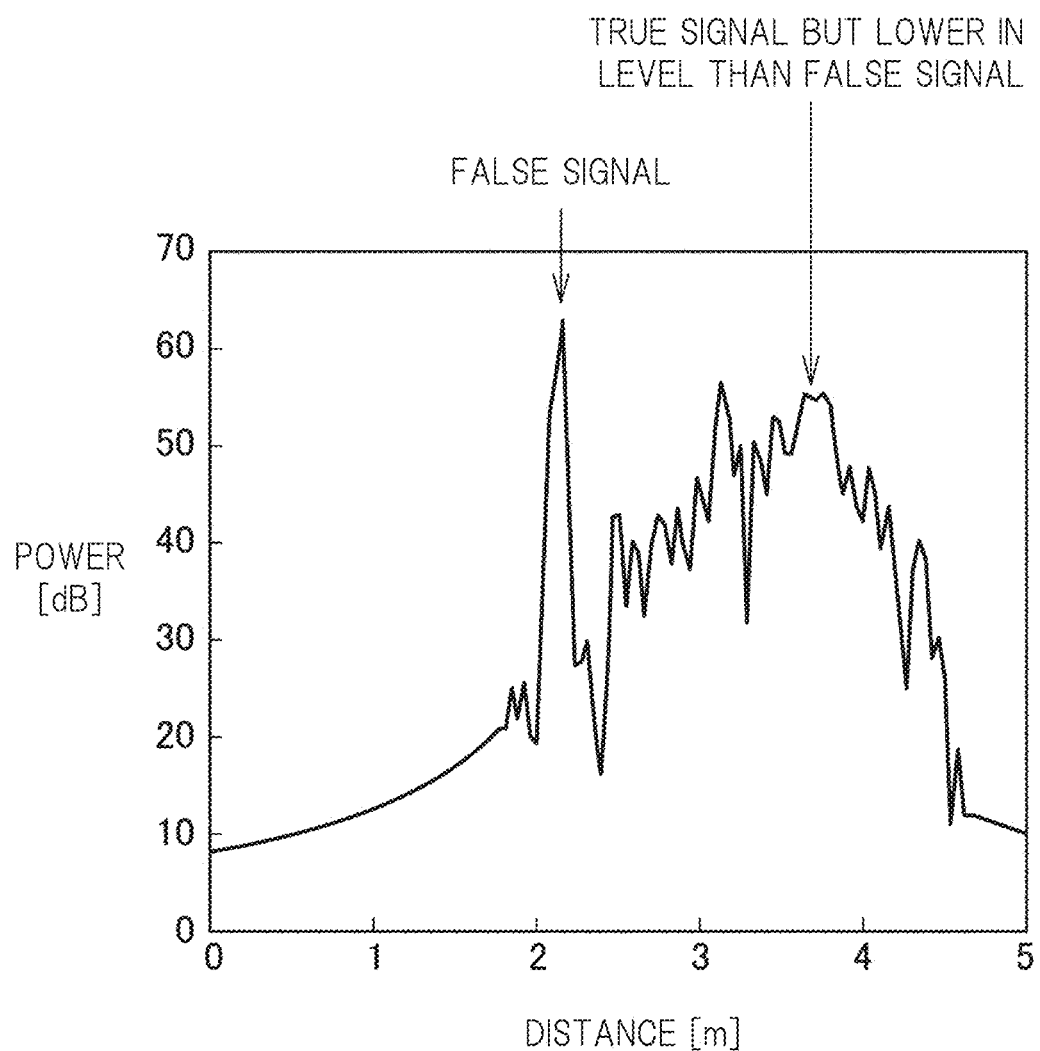
FIG. 7 is a diagram for describing a signal waveform corresponding to a beam direction angle according to the first embodiment.

FIG. 7 shows a waveform of signal strength data on received signals corresponding to transmitted signals outputted as a beam with a predetermined beam direction angle.

To be specific, FIG. 7 shows extracted signal strength data corresponding to a beam direction angle of about −60 degrees indicated in FIG. 6.

Referring to FIG. 7, a high signal-strength state is shown where the distance is about 2 m and also where the distance is about 4 m.

According to anticipation, high signal strength should appear at a distance of about 4 m (equivalent to the distance to the wall), but, in the case shown in FIG. 7, the signal strength is higher where false signals (noise) are generated due to reflection from the table.

Referring again to FIG. 6, false signals are observed at a same distance (about 2 m) over the whole beam scanning range. Therefore, determining a distance simply based on a peak of signal strength data may possibly result in erroneously recognizing a non-existent object based on false signals.

Though, in the present example, the FCM method is used as an example method for ranging, similar results can be obtained by various methods, for example, using pulse waves or FMCWs.

Determining a concrete distance value is possible, for example, by a peak detection method or a CFAR (Constant False Alarm Rate) method.

In the first embodiment, signal strength data on plural received signals, i.e. radio waves reflected after being transmitted from the radar device 1 to the whole beam scanning range, is stored in the buffer 22 and the signal strength data on the plural received signals is subjected to predetermined correction processing.

To be specific, the correction processing is performed on equidistance-based portions of the signal strength data on the plural received signals.

Figure 8:
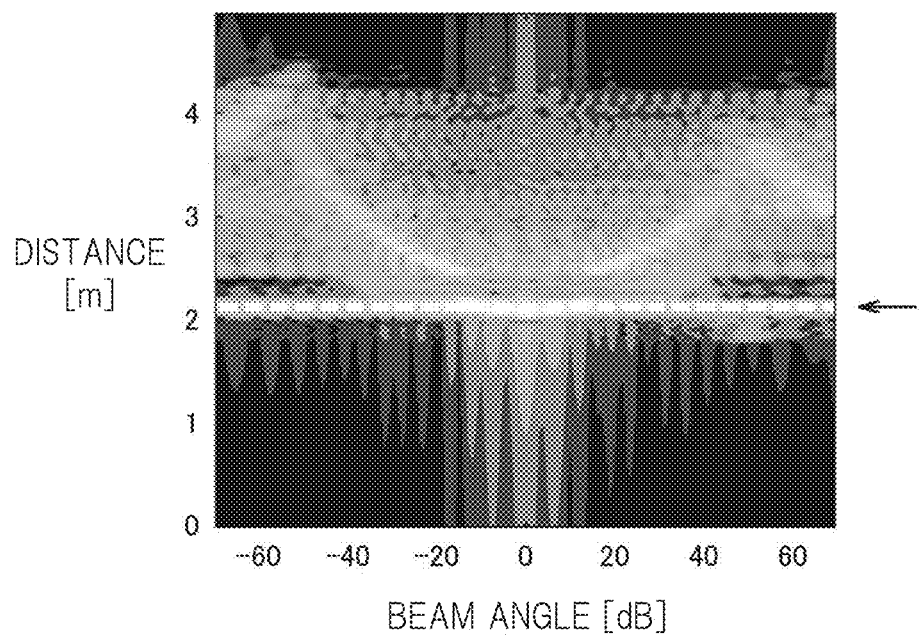
FIG. 8 is a diagram for describing correction processing performed by the radar device 1 of the first embodiment.

FIG. 8 is a diagram for describing the correction processing performed by the radar device 1 of the first embodiment.

FIG. 8 shows the state of signal strength data with respect to beam angles stored in the buffer 22. The data shown in FIG. 8 is the same as that shown in FIG. 6.

The correction processing is performed on an equidistance-based portion, indicated by an arrow in FIG. 8, of the signal strength data on the plural received signals.

Figure 9:
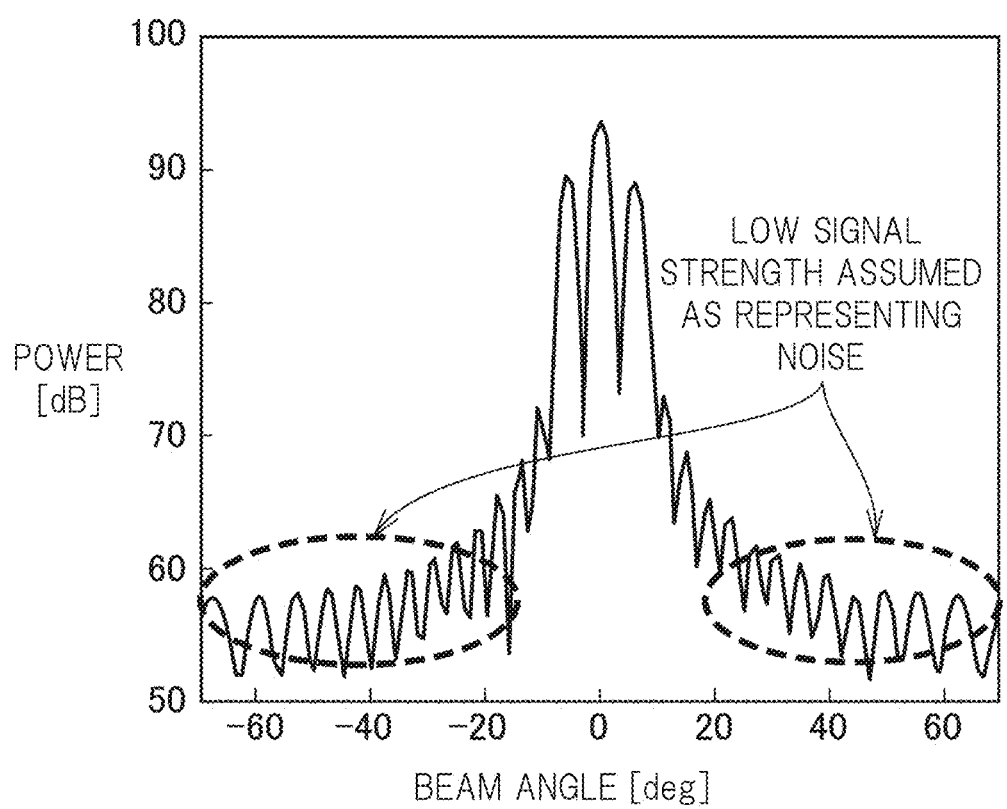
FIG. 9 is a diagram for describing an equidistance-based portion of signal strength data obtained in a scanning range of the radar device 1 of the first embodiment.

FIG. 9 is a diagram for describing an equidistance-based portion extracted from the signal strength data on the plural received signals.

FIG. 9 shows, as an example, an equidistance-based (about 2 m) portion, represented as a horizontal region pointed to by an arrow in FIG. 8, extracted from the signal strength data on the plural received signals.

Such an equidistance-based portion of signal strength data is highly likely to have been generated by a same object.

As shown in FIG. 9, signal strength is high in the scanning range with a beam angle range of −20 to +20 degrees and, outside the scanning range, signal strength is low.

Therefore, in the correction processing performed by the radar device 1 of the first embodiment, low signal strength in an equidistance-based portion of the signal strength data on the plural received signals is determined as representing noise.

This is based on the assumption that there is not any circular-arc-like or spherical object equidistantly from the radar device 1.

As a concrete correction method, offset processing for canceling noise included in the equidistance-based portion of the signal strength data is performed.

Assume, as an example, that average noise level is about 50 dB.

Noise level can be calculated by various methods. For example, by calculating an average value of an equidistance-based portion of signal strength data, the calculated average value may be regarded as a noise level. Instead of an average value, a median value, an Nth value or a mode value may be applied.

Alternatively, an average value of only the signal strength data lower than a predetermined value may be calculated. That is, a noise level may be calculated based only on data likely to be noise. In this way, the ranging accuracy of the radar device 1 of the present embodiment can be further improved.

In this case, the equidistance-based portion of signal strength data is subtracted by 50 dB for noise cancellation.

In this way, noise at the specific distance can be canceled.

In the present example, correction processing is performed on the signal strength data portion corresponding to a distance of about 2 m. Similar processing is to be performed on equidistance-based portions of the signal strength data covering the whole distance range.

To be specific, offset processing is performed as follows: equidistance-based portions of the signal strength data covering the 0-to-5 m distance range are extracted; the noise level of each equidistance-based portion of the signal strength data is calculated; and the signal strength corresponding to the calculated noise level is subtracted from the corresponding equidistance-based portion of the signal strength data.

Figure 10:
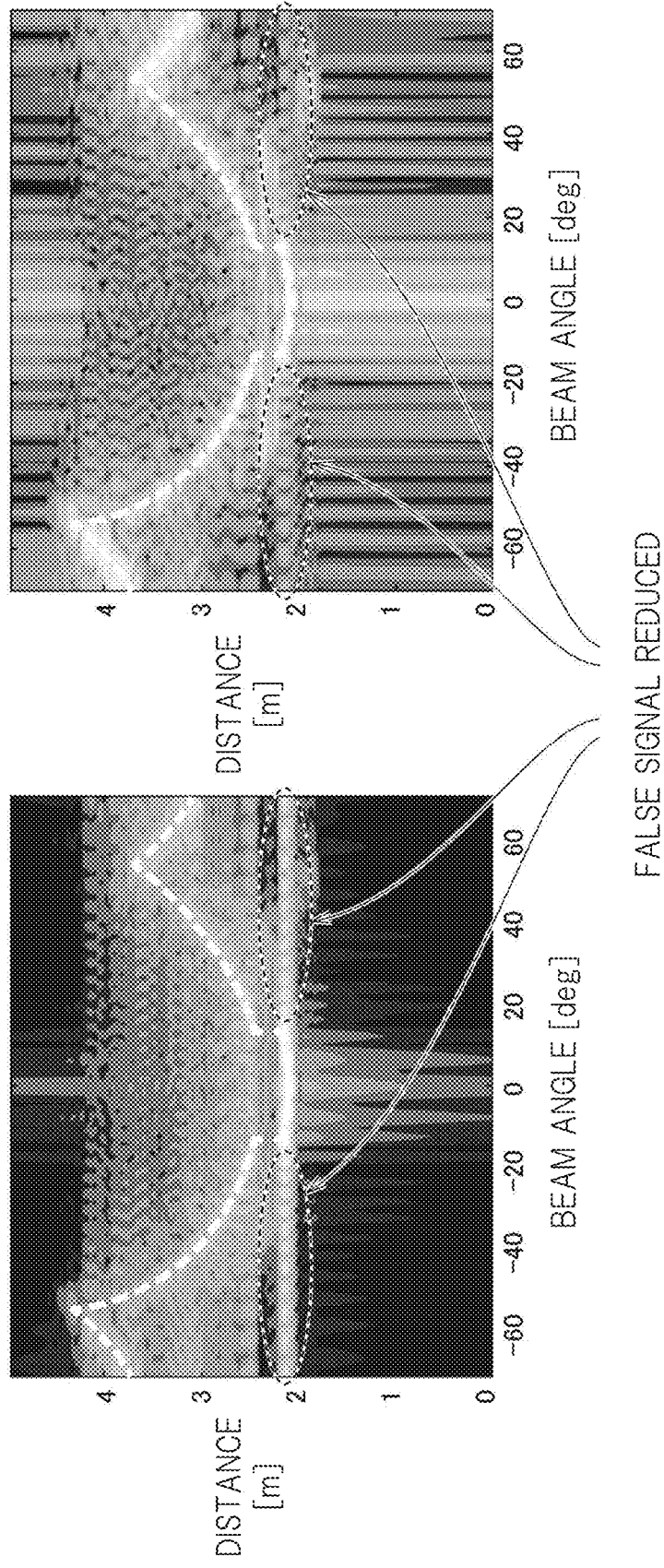
FIG. 10A is a diagram showing signal strength data before undergoing offset processing at a signal correction circuit 23 of the first embodiment.
FIG. 10B is a diagram showing the signal strength data after undergoing offset processing at the signal correction circuit 23 of the first embodiment.

FIGS. 10A and 10B are diagrams for comparing signal strength data before and after correction processing performed by the signal correction circuit 23 included in the radar device 1 of the first embodiment.

FIG. 10A shows the signal strength data in the same state as shown in FIG. 6.

FIG. 10B shows the signal strength data in a state with the signal strength of false signals generated by noise suppressed (reduced) as a result of offset processing performed by the signal correction circuit 23.

The distance extraction unit 24 obtains from the signal correction circuit 23 signal strength data, with false-signal strength suppressed, on the beam scanning range. The distance extraction unit 24 extracts distance information based on the corrected signal strength data. A concrete distance value can be obtained, for example as stated above, by a peak detection method or a CFAR (Constant False Alarm Rate) method.

By performing the processing described above, the radar device 1 of the first embodiment can calculate accurate distances by a simple method.

Figure 11:
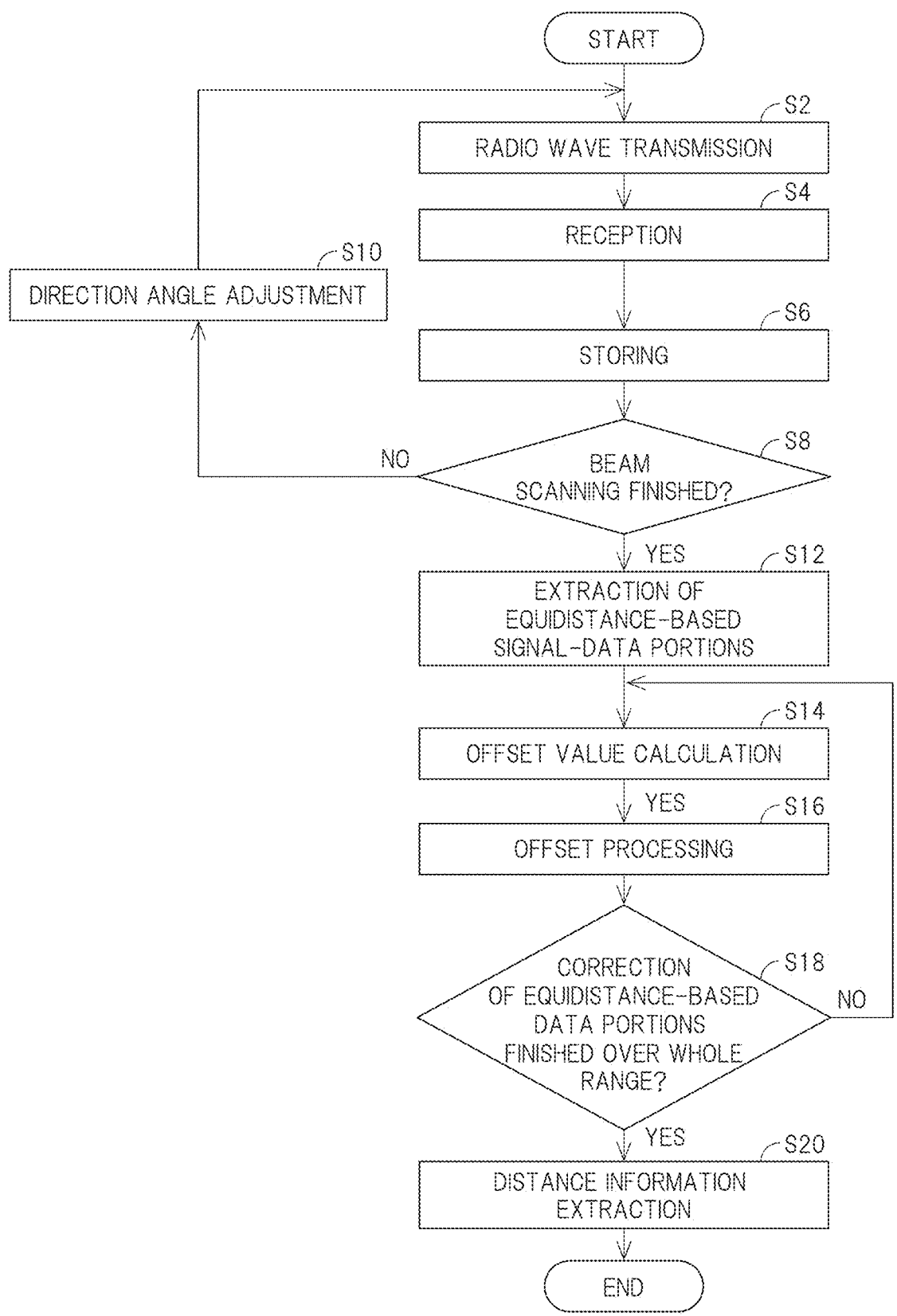
FIG. 11 is a flowchart of the correction processing performed by the radar device 1 of the first embodiment.

FIG. 11 is a flowchart of processing performed by the radar device 1 of the first embodiment.

Referring to FIG. 11, the transmitter 4 of the radar device 1 transmits radio waves toward an object (S2).

Next, the receiver 5 of the radar device 1 receives signals reflected from the object (S4). The received signals are inputted to the signal processing unit 12 after being converted into digital data by the ADC 10.

Next, the buffer 22 of the radar device 1 stores signal strength data generated by performing FFT processing, at the FFT 21, on the digital data inputted to the signal processing unit 12 (S6). At this time, the buffer 22 stores the signal strength data associating the data with beam direction angle information outputted from the beam direction control unit 11.

Next, the beam direction control unit 11 determines whether or not beam scanning of the whole scanning range has finished (S8).

When, in S8, it is determined that beam scanning of the whole scanning range has not finished (S8: NO), the beam direction control unit 11 adjusts the beam direction angle (S10).

Execution, then, returns to S2. The beam direction control unit 11 repeats the processing until beam scanning of the whole scanning range finishes.

When, in S8, it is determined by the beam direction control unit 11 that beam scanning of the whole scanning range has finished (S8: YES), the signal correction circuit 23 extracts equidistance-based portions of the signal strength data on the plural received signals stored in the buffer 22 (S12).

Next, the signal correction circuit 23 calculates an offset value for noise cancellation (S14).

The signal correction circuit 23 then performs offset processing in accordance with the calculated offset value (S16). To be specific, processing to subtract the calculated offset value from the corresponding equidistance-based portion of the signal strength data is performed.

Next, the signal correction circuit 23 determines whether or not correction of the equidistance-based portions of the whole scanning range has finished (S18).

When, in S18, it is determined that correction of the equidistance-based data portions of the whole scanning range has not finished (S18: NO), the signal correction circuit 23 returns to S14 and repeats the above processing after updating the equidistance-based data portion.

On the other hand, when, in S18, the signal correction circuit determines that correction of the equidistance-based data portions of the whole scanning range has finished (S18: YES), the distance extraction unit 24 extracts distance information based on the corrected signal strength data (S20).

Execution then ends (END).

As described above, noise can be suppressed by a simple method and the ranging accuracy with respect to an object can be improved.

According to existing techniques, ranging is made in one direction and a distance in the direction are determined based only on the ranging data obtained in the direction.

In the method used in the first embodiment of the present invention, signal strength data received by scanning the whole scanning range of the radar device 1 is stored in the buffer 22. Offset processing for data correction is performed on the equidistance-based portions of the signal strength data stored in the buffer 22. Distance information is extracted based on the corrected data.

The above-described configuration of the radar device 1 of the present embodiment makes it possible to remove noise with respect to an object by a simple method and improve ranging accuracy.

Second Embodiment

Though, in the first embodiment, noise level calculation is made based on ranging data obtained by one-dimensional scanning, in spatial measurement, two-dimensional scanning may be made.

To be specific, scanning may be made, for example, both in X direction and in Y direction perpendicular to the X direction.

It is then possible to obtain equidistance-based portions of signal strength data as two-dimensional planar data different from one-dimensional linear data.

Figure 12:
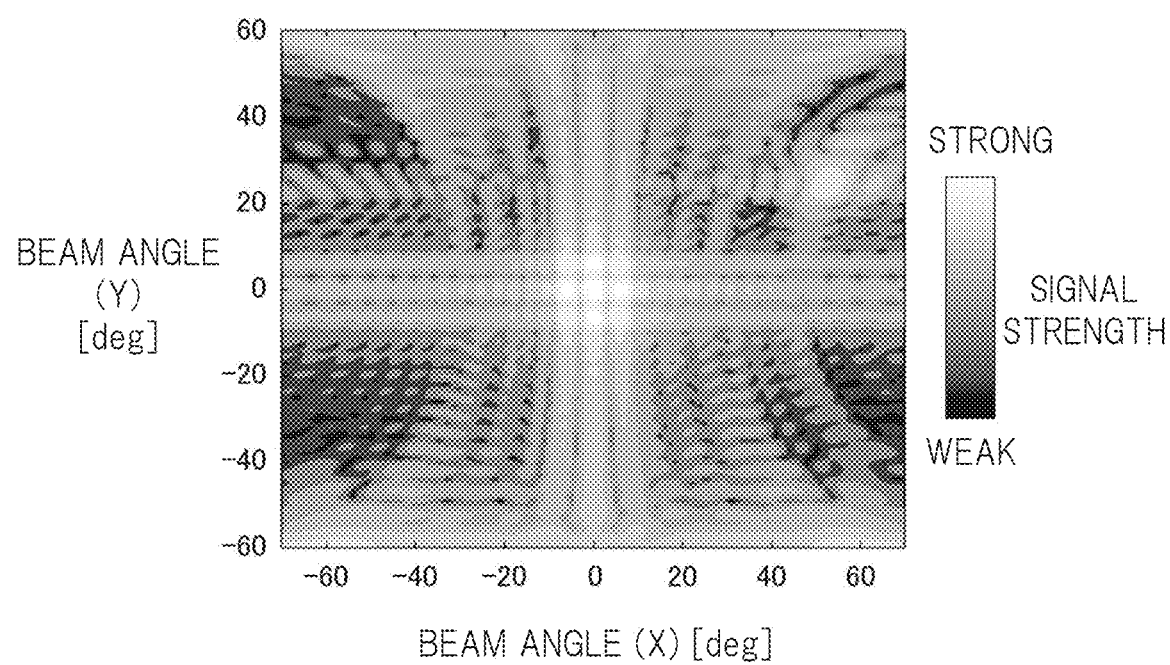
FIG. 12 is a diagram for describing a result of two-dimensional ranging according to a second embodiment.

FIG. 12 is a diagram for describing a result of two-dimensional ranging according to a second embodiment of the present invention.

In FIG. 12, signal strength data with respect to beam direction angles in X and Y directions is shown.

For two-dimensional plane data, too, the strength of false signals generated as noise can be suppressed by offset processing as described in terms of one-dimensional data according to the first embodiment.

That is, by performing offset processing, like the offset processing described in connection with the first embodiment, on the obtained planar data, the ranging accuracy can be improved.

The present disclosure has been concretely described based on embodiments, but the disclosure is not limited to the embodiments and can be modified in various ways without departing from the gist thereof.

What is claimed is:

1. A radar device, comprising:
   a transmission circuit which transmits radio waves;
   an adjustment circuit which adjusts transmission angles of the radio waves transmitted from the transmission circuit;
   a reception circuit which receives a plurality of signals, the signals being the radio waves transmitted, based on adjustment made by the adjustment circuit, from the transmission circuit and respectively reflected from an object; and
   a signal processing circuit which, by processing the received signals, calculates a distance to the object,
   wherein the signal processing circuit includes:
      a buffer which stores signal strength data on the received signals received by the reception circuit, the received signals respectively corresponding to the transmission angles; and
      a correction circuit which performs correction processing on the signal strength data on the received signals stored in the buffer,
   wherein the correction circuit:
      extracts, from the signal strength data on the received signals stored in the buffer, signal strength data portions, each signal strength data portion being based on an equidistance from the radar device;
      calculates an average value of the extracted signal strength data portions; and
      performs an offset processing on the signal strength data on the received signals stored in the buffer by subtracting the calculated average value from the corresponding extracted signal strength data portions.

2. The radar device according to claim 1, wherein the correction circuit:
   extracts, from the signal strength data on the received signals stored in the buffer, the signal strength data portions, each signal strength data portion being lower in signal strength than a predetermined value.

3. The radar device according to claim 1, wherein the adjustment circuit adjusts radio-wave transmission angles such that the radio waves are transmitted from the transmission circuit to a first scanning range in a first direction and to a second scanning range in a second direction perpendicular to the first direction.

4. A method for controlling a radar device, the method comprising the steps of:
   transmitting radio waves;
   adjusting transmission angles of the radio waves;
   receiving a plurality of signals, the signals being the radio waves transmitted based on the adjustment and respectively reflected from an object; and
   calculating a distance to the object by processing the received signals,
   wherein the step of calculating a distance includes:
      storing, in a buffer, signal strength data on the received signals corresponding to the transmission angles; and performing correction processing on the stored signal strength data on the received signals, and wherein the correction processing includes:

extracting, from the signal strength data on the received signals stored in the buffer, signal strength data portions, each signal strength data portion being based on an equidistance from the radar device;

calculating an average value of the extracted signal strength data portions; and performing an offset processing on the signal strength data on the received signals stored in the buffer by subtracting the calculated average value from the corresponding extracted signal strength data portions.

* * * * *